UNITED STATES PATENT OFFICE.

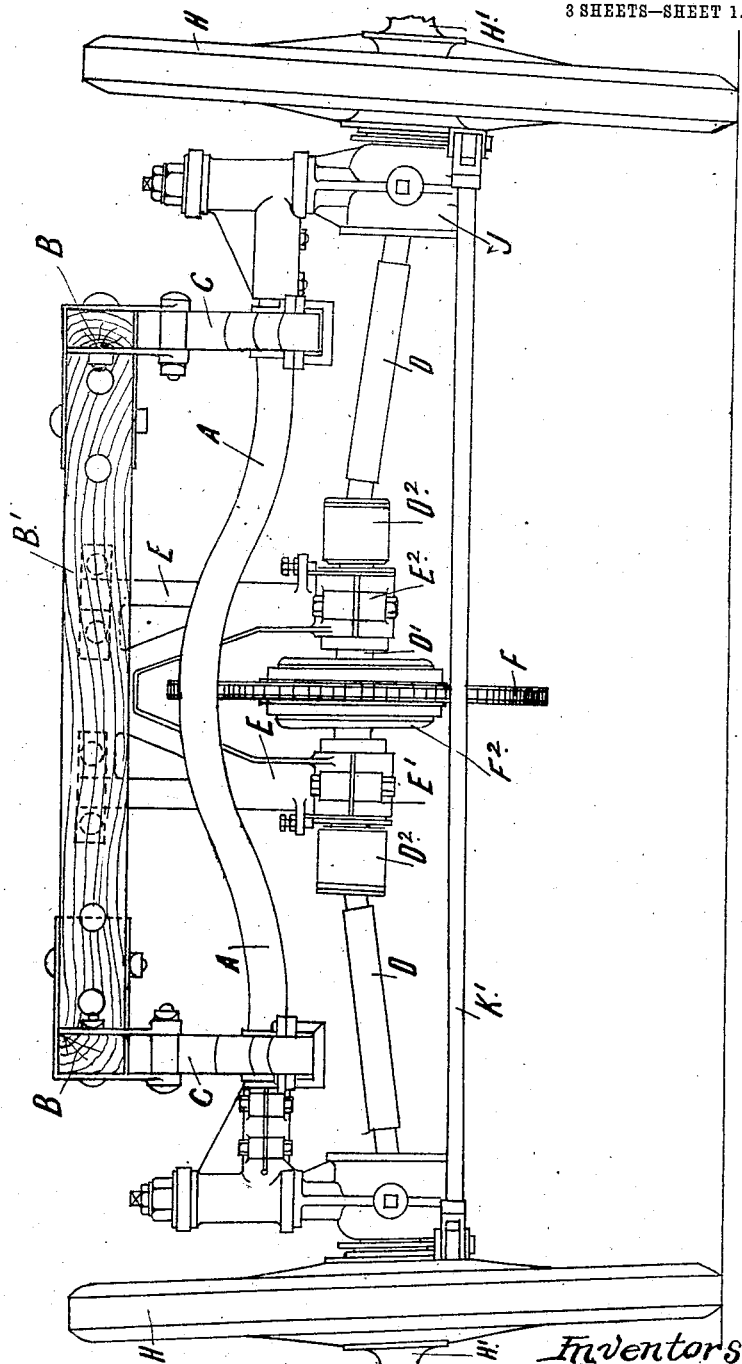

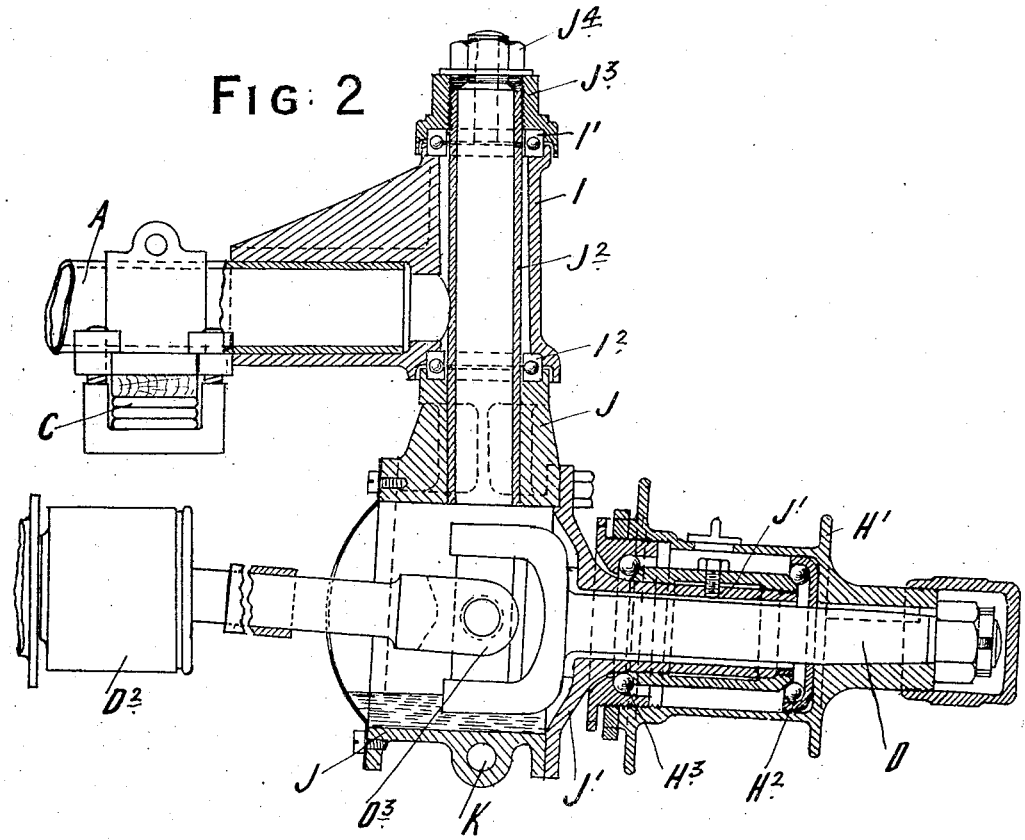

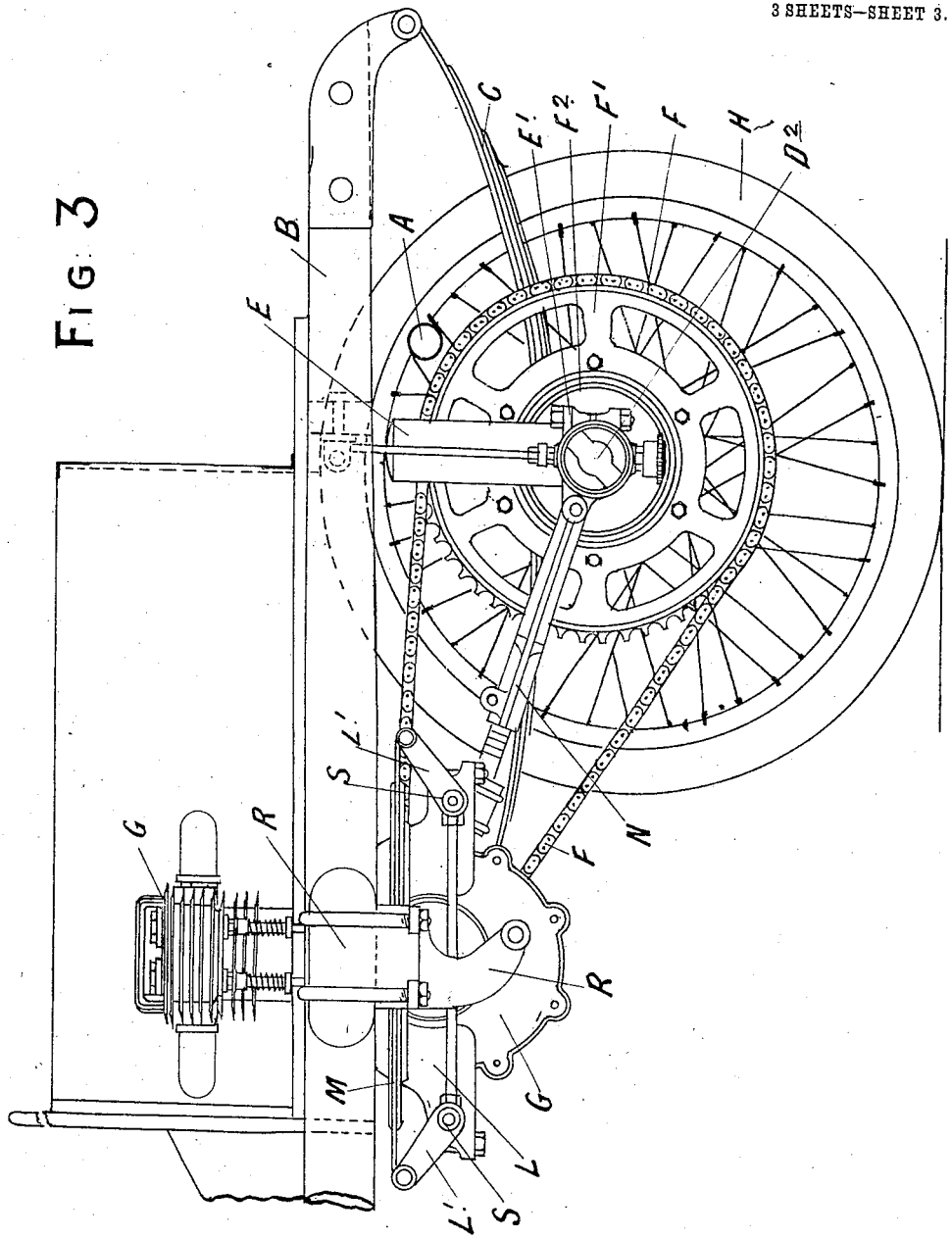

FREDERICK RIPON MARTIN AND OSWALD MONTAGU SHEPHERD, OF LONDON, ENGLAND.

MOTOR-CAR.

952,457.  Specification of Letters Patent.  Patented Mar. 22, 1910.

Application filed January 7, 1907. Serial No. 351,281.

*To all whom it may concern:*

Be it known that we, FREDERICK RIPON MARTIN, a subject of the King of Great Britain, and a resident of 24 Egerton Gardens, Ealing, London, England, and OSWALD MONTAGU SHEPHERD, a subject of the King of Great Britain, and a resident of Rutland House, Hanwell, London, England, have invented a new and useful Improvement in Motor-Cars, of which the following is the specification.

There have been several attempts to provide a satisfactory arrangement whereby the driving of the steering wheels of motor cars may be effected. Hitherto, however, no arrangement suggested has proved quite successful as far as we are aware, and we have therefore devised the hereinafter-described improvements whereby better results may be obtained than heretofore.

According to our invention we mount the steering wheels on swiveling axles which consist of hollow extensions extending horizontally from boxes or casings carried by vertical pivotal arrangements mounted on a dead axle which supports the front of the body of the vehicle. To drive the steering wheels thus mounted, flexible shafting is employed, or a driving axle having at least two universal joints on either side of the balance gear to which it is connected. Such flexible or jointed shafting is not, however, adapted for supporting the balance gear box in a suitable manner, and we therefore carry the latter in a bracket pendent from the car frame, which bracket may be properly distanced to maintain at suitable tension the chain connecting the balance gear with the engine, by means of an adjustable radius bar.

The flexible or universal-jointed driving shaft passes freely through the hollow swiveling axles and is connected to the wheels at the outside. When a driving shaft universally-jointed at intervals and not entirely flexible is employed, the one joint that connects the driving shaft to the wheel must be arranged in the same vertical plane as the pivot or swivel of the swiveling axles. The said joint will thus be inclosed within the before-mentioned box or axle casing, and this box or casing may be conveniently used as a bath for lubricating oil for the joint.

The engine is preferably mounted in a self-contained cradle entirely suspended from the car frame at two or more points by springs, so that the vibrations of the engine are not communicated to the car, and on the other hand the jolting and twisting imparted to the car frame are not imparted to the engine.

The accompanying drawings illustrate one embodiment of our invention.

Figure 1 is a front elevation of the front axles of the car, showing the arrangement of the dead and the live axles. Fig. 2 is a section through the hollow swiveling axle or casing showing the connection of the flexible or live axle to the wheel. Fig. 3 is an elevation showing the method of the suspension of the engine from the frame and of the bracket carrying the balance gear. It is an elevation of the front of the car, with one front wheel, front spring and steering gear removed.

Like letters refer to like parts in all the figures.

A is the dead or weight-carrying axle, upon which the frame B is supported by the springs C.

D is the driving or live axle, which is carried at its center on the fixed support or bracket E, which is suspended from the cross bar $B^1$ of the frame B. The chain F, which is connected to and driven by a chain-wheel (not shown) fitted on the crankshaft of the motor G drives the chain-wheel $F^1$. This larger chain-wheel $F^1$ is bolted to the outside of the drum or casing $F^2$, which contains the differential or balance gear, the latter being mounted on the central portion $D^1$ of the driving axle D. This central portion of the axle is carried in the bearings $E^1$ $E^2$, which are suspended from the ends of the fixed bracket E. Each end of the central portion $D^1$ of the driving axle D is provided with a universal joint box or casing $D^2$ $D^2$, which flexibly connects by means of the jointed parts of the axle D to the wheel hubs H¹ of the driving front road wheels H.

At each end of the dead or weight-carrying axle A is rigidly fixed the casting forming the pivot head I. Within the pivot head I (Fig. 2) are mounted the ball bearings I¹ I². The casting J forms the main hub casing, to which the flange of the hub bearing sleeve J¹ is bolted. The pivot tube J² passes through the center of the ball bearings I¹ I², and is secured at the top by the adjustable screw-cap J³, closed by the inside screw-locking nut J⁴. The hubs H¹ rotate on the ball bearings H² H³.

Within the hollow axle or sleeve J¹ is placed concentrically the extension of the driving axle D, to which is securely keyed the hub H¹ of the front driving wheel.

The universal joint D³ rotates within the hollow casting J, which is closed by a sheet metal plate provided with a slot through which the driving axle D passes. The interior of the casting J contains an oil bath for the universal joint D³. The center of the universal joint D³ must be on the same center line as that of the axial or pivotal tube J² to allow of the rotation of the driving axle D, when the steering wheel is placed at an angle for steering purposes. The steering lever directly operating the wheel is fitted to the casting J at K.

K¹ is the link (Fig. 1), which connects the two steering arms or levers together.

The motor G is suspended from the frame B (Fig. 3) by means of the underframe or cradle L, which is supported by the links or shackles L¹ from the springs M. One spring only is shown, the other spring being fitted on the other side of the engine and change speed gear. This latter may be of any known and suitable type.

The plates or castings R are secured to the frame member B, one on each side thereof, by the clip bolts. The spring M fits between the two plates R and is thus secured to the bottom of the frame member B. The lower ends of the castings or plates R carry the car front springs C. The tubes or bars S extend across the car, and are suspended by the links L¹ from the springs M on each side of the car. The cradle L carrying the motor G is directly clipped or bolted to the transverse rods or bars S.

The distance rods or radius bars N are each fitted to the bearings E¹ E² on arms E E (Fig. 1) of the pendent bracket. The distance rods N are adjusted to maintain at a suitable tension the chain F.

Although a chain is shown as the power-transmitting means from the engine to the central portion of the shaft, it will be obvious that the engine may be driven by gear wheels owing to the central portion D¹ of the shaft D being supported upon the bracket E. It will be seen that this independent suspension of the engine from the car frame by springs causes less of the vibration of the engine to be communicated to the car, and the shocks and stresses transmitted to the frame while the car is running are conveyed in a greatly lessened degree from the frame to the engine. It will also be observed that, owing to the provision of the double or forked radius or distance rods, both the engine and the balance gear are capable of the requisite relatively independent vertical movement without any alteration in the distances apart of the center of the crankshaft and the center of that part of the driving or live axle upon which the balance gear is mounted. Moreover, the flexible connection from the shaft in the relatively fixed bearings on the bracket E not only permits of the independent vertical movement of the front driving wheels, but the construction shown allows of the simultaneous steering and driving of the front wheels.

We are aware that it has been proposed before to use a live and a dead axle on the forecarriage of a motor vehicle, but our construction is a considerable improvement upon, and has several essential points of difference from, those constructions before proposed.

What we claim as our invention and desire to secure by Letters Patent is:—

1. A motor vehicle comprising the frame thereof, a dead axle carrying the vehicle wheels, a live axle supported by said frame, a motor having geared connection with the live axle, means for suspending said motor comprising springs secured to the frame, a casing and links connecting said springs and casing, and springs resiliently supporting the aforesaid dead axle, one end of each spring being secured to the motor casing.

2. A motor vehicle comprising the frame thereof, a dead axle resiliently carried thereby, a live axle, comprising a central portion rotatably supported by the frame independently of the dead axle, and side portions flexibly connected to said central portion by means of universal joint boxes, said support for the live axle being a forked bracket suspended from a cross bar of the frame, a motor having a balanced geared connection with said live axle and means for effecting relatively independent vertical movement of said engine and balance gear without altering the distance between the driving connections thereof.

3. A motor vehicle comprising the frame thereof, a dead axle resiliently carried by said frame, a cross bar on the frame, a bracket suspended from said cross bar, a live axle comprising a central portion having bearings in the bracket, and side portions having rigid connection with the wheels of the vehicle, said wheels being carried by a pivoted head secured to the ends of said dead axle and extending downwardly therefrom in universally connected relation to said live axle.

In testimony whereof we have signed our names to this specification in the presence of the two subscribing witnesses.

FREDERICK RIPON MARTIN.
OSWALD MONTAGU SHEPHERD.

Witnesses:
I. D. Roots,
A. Nutting.